F. STEBLER.
FRUIT ELEVATOR.
APPLICATION FILED APR. 5, 1909.
1,027,573.
Patented May 28, 1912.
2 SHEETS—SHEET 2.
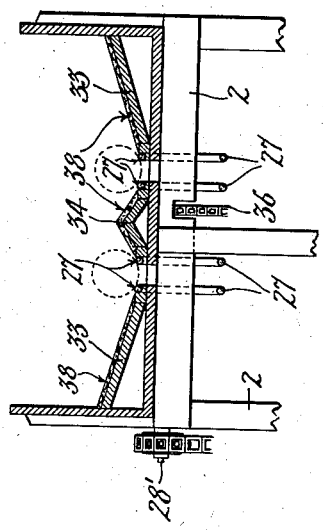
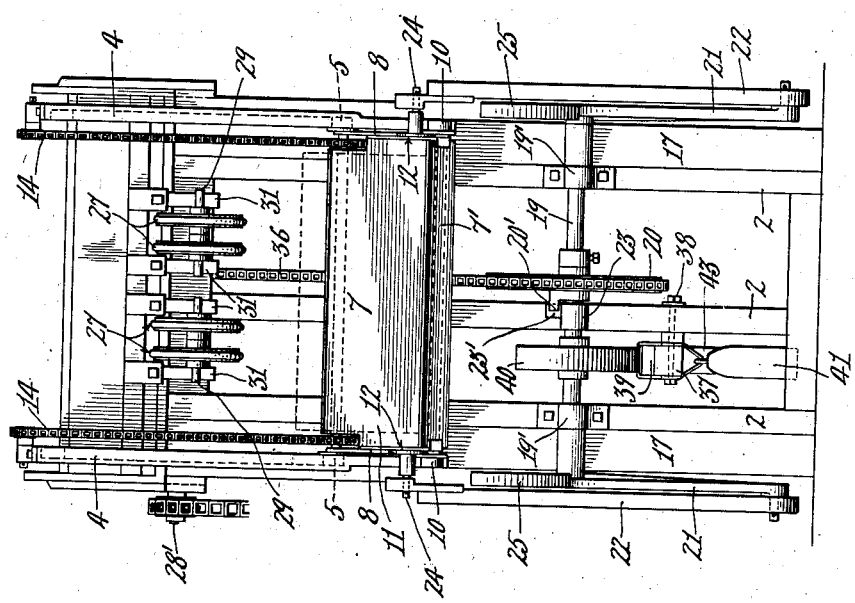

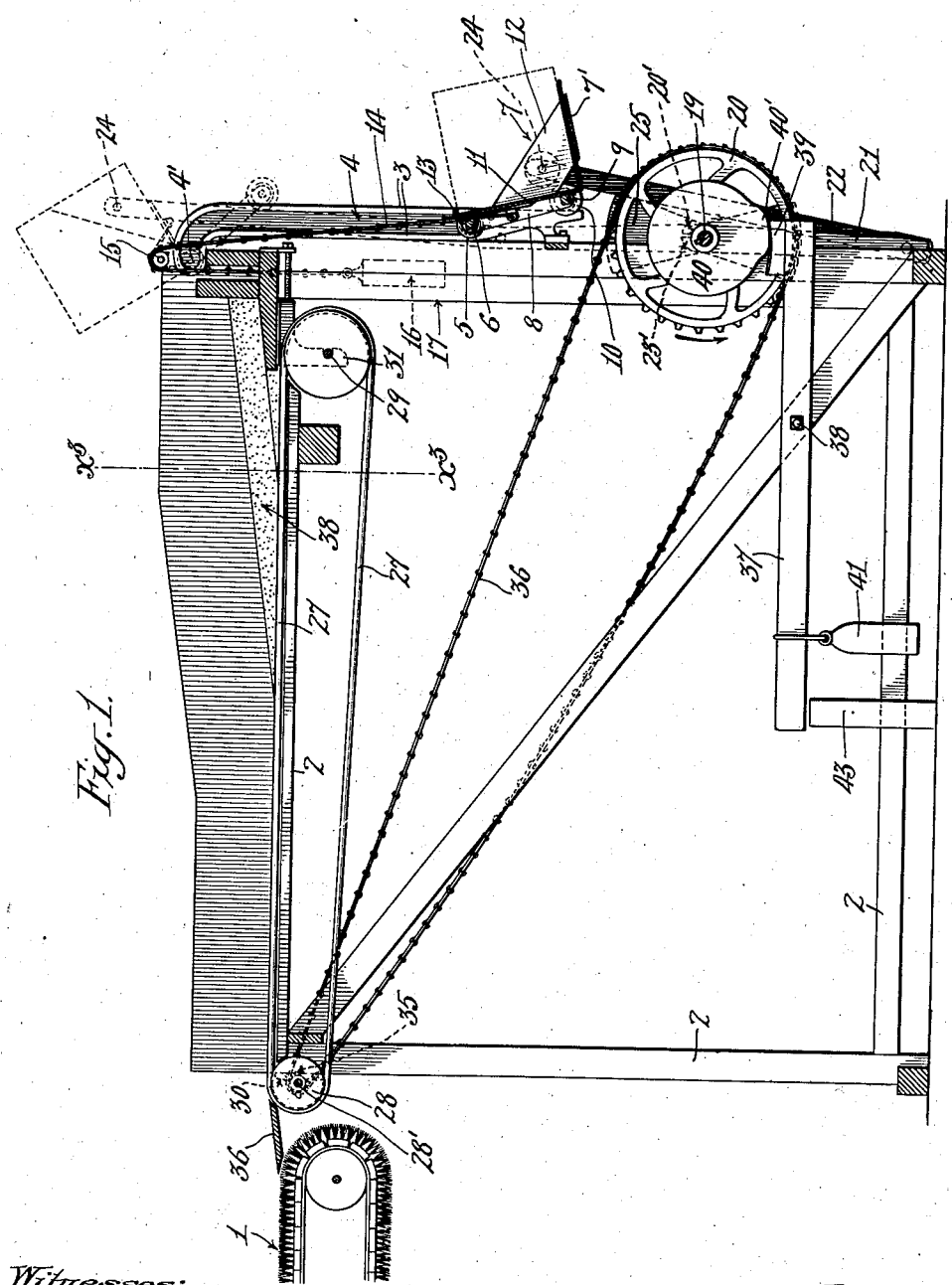

UNITED STATES PATENT OFFICE.

FRED STEBLER, OF RIVERSIDE, CALIFORNIA.

FRUIT-ELEVATOR.

1,027,573.　　　　　Specification of Letters Patent.　　Patented May 28, 1912.

Application filed April 5, 1909. Serial No. 488,115.

*To all whom it may concern:*

Be it known that I, FRED STEBLER, a citizen of the United States, residing at Riverside, in the county of Riverside and State of California, have invented a new and useful Fruit-Elevator, of which the following is a specification.

This invention relates to an elevator for elevating and delivering fruit to fruit cleaners, graders or other fruit handling apparatus.

The main object of the present invention is to provide a fruit elevator adapted to receive the ordinary fruit boxes and to elevate and dump the same and deliver the fruit therefrom to the fruit handling apparatus aforesaid.

A further object of the invention is to facilitate the delivery of the boxes to the machine by the operators in charge.

Another object is to provide automatic and mechanical means for dumping, as hand dumping is unsatisfactory from carelessness and other causes resulting in injury to fruit, as, for instance, pushing it forward in the hopper with the box.

Other objects of the invention will appear hereinafter.

The accompanying drawings illustrate the invention.

Figure 1 is a longitudinal section of the elevator. Fig. 2 is a rear elevation thereof. Fig. 3 is a vertical section on the line $x^3$—$x^3$ in Fig. 1, illustrating the hopper, into which the fruit is delivered by the elevating mechanism, and illustrating the conveying means for automatically forwarding the fruit through the cleaner, grader or other fruit handling apparatus, and simultaneously automatically sifting out and expelling any dirt, leaves or foreign material which may be mixed with the body of fruit.

1 designates the fruit cleaner or other fruit handling apparatus to which the fruit is to be raised and delivered by the elevator. The elevator comprises an elevator mechanism proper for raising the fruit and a delivery means for delivering the fruit from the elevator mechanism to the fruit handling means 1. The said parts are mounted in a suitable frame 2 which is open at the ends and is provided at each side of the front end with a vertical track 4, said track having flanges 3 to engage and guide rollers 5 at the opposite ends of a shaft 6 which is connected to and supports a box carrier 7. The upper end of track 4 curves backward to form a horizontal extension 4'. An arm or link 8, connected to the shaft 6 at each end of the box, carries a cross bar 9 with a roller 10 at each end, said rollers engaging and rolling on the outside of the track 4. Shaft 6 with the links 8, cross bar 9 and rollers 5 and 10, connected thereto, constitute a vertically movable member on which the box carrier is pivoted, this vertically movable member controlling the movement of the box carrier, by its engagement with the track, so that the box carrier is guided vertically so as to be movable between lower and upper positions. This vertically movable means is arrested when the box carrier reaches its upper position, by engagement of the rollers 5 in the horizontally extending track portions 4', and means are provided for effecting further movement of the box carrier, at this time, to tip the said carrier. Rollers 5 and 10 are flanged to engage laterally with the track 4 to hold the box carrier against lateral displacement.

The box carrier 7 is formed as an angle frame open at top and in front and adapted to receive an ordinary fruit box, for example, an orange or lemon box, the carrier being normally supported in position with its bottom plate or bar 7' tipped upwardly and forwardly and with the back plate 11 tipped upward and rearwardly at right angles to the bottom 7', so that the fruit box when placed on the bottom plate will slide easily to and against the back plate and will rest in this position by gravity. Brace bar or means 12 is provided extending diagonally between the back and bottom plates or portions 11, 7' at each side of box 7, to support the bottom plate and also to serve as a lateral retainer for the fruit box. The back plate 11 is provided at its upper end with a flange or ledge 13 to retain the box while the fruit is being dumped, as hereinafter described.

At each end of the box carrier an elevator chain 14 is attached to the back 11 of carrier 7 aforesaid at a point eccentric to the pivotal connection or shaft 6 of the box, and passes upwardly and over a wheel 15 at the top of frame 2 and then down to a counterweight 16 running in a vertical box or casing 17.

The operating means for the elevator comprises an operating shaft 19 mounted in bearings 19' on the frame 2, an operating wheel 20 loosely mounted on said shaft and connected to be driven as hereinafter described, arms 21 fast on said shaft 19 and engaged by the said operating wheel, as hereinafter set forth, and a link 22 connected to each of the aforesaid arms 21 and to the brace bars 12 of box carrier 7. The connection of links 21 to the box carrier 7 is out of vertical line with the engaging connection between the box carrier and the track, so that when the stop means on the track, constituted by the upper end of the slot thereof, arrests the upward movement of the carrier, the further movement of said links will tip the carrier. The connection between the operating wheel 20 and the arm 21 consists of a lug 20' on said operating wheel and a lug 23' on collar or hub 23 on shaft 19 carrying the said arm 21, which permit of lost motion between the said parts and enable the operating wheel to turn the shaft 19 and arm 21 in the operation of the mechanism, as hereinafter described. Crank or arm 21 is provided with a counterweight 25 extending oppositely to said arm.

Brake means are provided for the elevator lifting mechanism consisting of a brake lever 37 pivoted at 38 and having a shoe 39 adapted to engage with a projecting portion 40' on a disk 40 attached to shaft 19, said brake lever being provided with an operating weight 41 to produce the breaking pressure against the brake wheel portion 40', and a stop means 43 is provided for limiting the movement of the brake lever so as to prevent engagement of the brake shoe except when the projecting portion 40' is opposite the same.

The fruit is delivered from the box carrier into a suitable hopper provided with means for automatically conveying the fruit to the desired cleaner, brusher, grader or other machine or receptacle. This hopper is preferably so related to the conveying means that any foreign material, such as dirt, leaves, etc., mixed with the fruit will be sifted out as the fruit is carried out of the hopper by the conveying means. In Fig. 3 an embodiment of such construction and interrelation of parts is shown. The hopper is shown as provided with portions 33 at each side of the conveyer means. These portions 33 incline downwardly from the sides of the hopper and inwardly to the edge of the conveying means, thus, in effect, forming a trough in the bottom of the hopper. The bottom of this trough is preferably open at the point where the lower edges of the portions 33 approach each other, thus forming a sifting slot or opening. There may be any desired number of conveying means. In the drawing I have illustrated the trough like bottom of the hopper as provided with two conveying means and two open sifting slots or openings, both these being arranged between the inclined side portions 33 forming the hopper bottom. When two or more conveying means are provided in the hopper I preferably provide between each conveying means with its open sifting or discharge slots or openings, and the adjacent conveying means, with its open sifting or discharge slot, a portion 34 having inclined sides preferably rising above the conveying means and inclined downward toward the conveying means at each of its sides and also preferably inclined forwardly with respect to the direction of motion of the conveying means. In order to most fully utilize the sifting slot or opening for the discharge of dirt, leaves, etc., I prefer to form each conveying means of two endless cables or rope belts 27, mounted on pulleys or wheels 28, 29, journaled in bearings 30, 31 on the frame 2. The edges of the portions 33, and adjoining edges of the portions 34, when more than one conveying means is used, are provided with grooves in which the rope belts 27 travel and rest. The two cables or rope-belts, forming a conveying means, are spaced apart a sufficient distance so as to permit the free sifting out and discharge of the leaves and dirt and not permit the fruit to fall therethrough. A stripper plate 36 may be provided between the conveying means 28 and the apparatus 1.

The shaft 28' of the forward set of conveyer pulleys preferably constitutes the driving shaft for the elevating mechanism, said shaft being provided with a suitable driving connection and carrying a sprocket wheel 35 connected by a sprocket chain 36 with the operating wheel 20 which is also formed as a sprocket wheel.

I preferably cushion the bottom of the hopper, as indicated at 38, on the portions 33, 34 of the hopper bottom.

The conveyers 27 being in the form of cables or rope belts present smooth surfaces engaging the fruit by frictional contact, in distinction to positive engagement by spiked or toothed surfaces, such as would be liable to injure the fruit. Said cables are preferably embedded in the inclined floor of the trough, so that their tops are substantially flush with said floor, the surface of said cable being exposed at the top and on the side toward the slot, so that the fruit may rest thereon at each side and be carried along directly over the slot.

The operation is as follows: Normally the box carrier 7 rests in the position shown in full lines in Fig. 1, the back 11 thereof resting against the cross shaft 9 of the arms 8 and forming a rectangular seat for the fruit boxes, said seat being tipped slightly upward to retain the box as above stated. The rotation of operating wheel 20 proceeds part of the time without effect on the elevator mechanism, but when the lug 20' on said wheel strikes the lug 23' on the arm 21, the said arm is rotated and the link 22 is thereby pushed upwardly and raises the box carrier 7, the rollers 5 of the box carrier running in the guide tracks 4 and the rollers 10 of the arms 8 running on the outside of tracks 4. In this operation the counterweights 16, 25 overcome part of the weight, for example, part of the dead-weight of the box carrier and box and the weight of the arm 21, thereby diminishing the amount of power required to perform the lifting operation. As the box carrier approaches the upper end of its stroke the rollers 5 thereof run into the forwardly projecting portions 4' of the guide tracks 4, and on reaching the horizontal portion of said guide track the motion of the upper end of the box carrier is arrested. Continued motion of the arm 21 and link 22 causes the lower end of the box carrier to continue its upward movement, causing the box carrier to turn on the shaft 6 of rollers 5 as the center, and causing the box to tip downwardly and forwardly, as shown in dotted lines in Fig. 1, and to discharge its fruit onto the table means, the fruit then running from the table means onto the conveyer or conveyers 27 and being delivered by the conveyer or conveyers 27 and stripper plate 36 onto the fruit handling apparatus 1. This lifting operation corresponds roughly to one-half revolution of the operating wheel 20, and during this one-half revolution the lug 23' of the arm 21 has been against the lug 20' of the operating wheel. As these lugs pass over the dead-center at the top of the wheel, the tendency of the weight of the box carrier, etc., is to accelerate instead of retard the rotation of the arm 21, and the said arm will therefore move forward, the lug 23' leaving the lug 20' and the arm 21 rapidly completing its rotation so that the box carrier quickly descends to its lowermost position shown in Fig. 1. This motion is finally arrested by brake means 37, 40, which brings the rotary member or shaft 19 to rest in a gradual smooth manner and prevents it from moving too far under the action of the momentum of the parts. The lifting mechanism then remains idle during the time that the operating lug 20' is catching up with the operated lug 23', this corresponding approximately to one-half revolution of the operating wheel. During this time the box carrier 7 remains in the lowermost position shown in full lines in Fig. 1 and in convenient position for the fruit boxes to be deposited thereon by the attendants or operators. The elevator thus provides for maintaining the box for a definite interval of time in stationary position for the reception of the fruit, then lifting the box and dumping it and finally returning the box to lowered position by a quick movement.

While I have shown the means for retaining the box on the carrier when tipped, as a ledge 13 formed as a part of the back plate 11, it is obvious the many expedients may be used in its place, such for instance as a canvas strip attached on the plate 11, and I do not confine myself to forming such means as a metallic part or as integral with the plate 11.

What I claim is:

1. In a fruit elevator, vertically movable means, a box-carrier pivotally mounted on said vertically movable means to raise and lower therewith and to tip thereon, means for arresting the upward movement of the vertically movable means, and means for raising and lowering the box-carrier with the vertically movable means and for operating on the box-carrier, on the arrest of said vertically movable means, to tip the box-carrier when in elevated position.

2. A fruit elevator comprising a frame, a box carrier mounted to move up and down thereon, means for lifting the carrier, comprising a rotary member provided with a crank arm, a connection from said crank arm to the carrier, a rotary driving means, means for operatively disconnecting the rotary member from the said driving means to enable the carrier to descend by gravity, and brake means for arresting the movement of the rotary member.

3. A fruit elevator comprising a frame, a box carrier mounted to move up and down thereon, a rotary member, means for driving said rotary member, an arm mounted to rotate and connected to the box carrier to lift the same, means on said rotary member and on said arm to operatively connect the arm with the rotary member during a portion of the rotation of said member and to allow the arm to move relatively to the rotary member during another portion of such rotation of the rotary member to allow the box carrier to descend by gravity.

4. In a fruit elevator, a box carrier formed as an angle member open at top and front to receive a box and provided at its top with a ledge to retain the box when the carrier is in tipped position, and means for raising and lowering said carrier and for tipping said carrier to dump the fruit therefrom, comprising vertically movable operating means connected to the carrier, and a vertically extending track having an engaging connection with the carrier, to guide the carrier in its vertical movement, and having a horizontal extension to arrest the vertical movement of the connected part of the carrier and cause the carrier to move horizontally, the connection of the operating means to the carrier being out of the vertical line of the engaging connection with the track, so that when the motion of the carrier is arrested it will be tipped by the further movement of the operating means.

5. In a fruit elevator, track means provided with a stop portion, a box carrier having engaging connection with the track means to be guided thereby and to be arrested by the stop means, vertically movable means connected with the carrier at a point out of line with the connection to the track means whereby the carrier is raised by said vertically movable means until it is arrested by the stop on said track means and is then tipped by the further vertical movement of the operating means.

6. A fruit elevator comprising a frame provided with tracks, a box carrier having means engaging in said tracks to guide the carrier thereon, a rotary crank member, and means connected thereto and to the box carrier for raising and lowering the box carrier on said tracks, and means for tipping the box carrier at the upper end of the tracks.

7. A fruit elevator comprising a frame provided with tracks, a box carrier having means engaging in said tracks to guide the carrier thereon, a rotary crank member, and means connected thereto and to the box carrier for raising and lowering the box carrier on said tracks, means for tipping the box carrier at the upper end of the tracks, said tracks having horizontal extensions at their upper ends, and lifting means for the box carrier being adapted to lift the lower end of the box after the upper end has been arrested by such extensions.

8. A fruit elevator comprising a frame having vertically extending tracks provided with horizontal extensions at their upper ends, a box carrier having means engaging in said tracks to guide the box carrier, means pivotally connected with the box and provided with means engaging said tracks to hold said last-named means in position for sustaining the box carrier during the lifting motion thereof, and an operating mechanism provided with means connected to the box carrier to raise the same to the upper end of the elevator and to lift the lower end of the box carrier after the upper end thereof has been arrested by engagement of its guiding means in the horizontal extension of the aforesaid track means.

9. A fruit elevator comprising a frame having vertically extending tracks provided with horizontal extensions at their upper ends, a box carrier having means engaging in said tracks to guide the box carrier, means pivotally connected with the box and provided with means engaging said tracks to hold said last named means in position for sustaining the box carrier during the lifting motion thereof, and an operating mechanism provided with means connected to the box carrier to raise the same to the upper end of the elevator and to lift the lower end of the box carrier after the upper end thereof has been arrested by engagement of its guiding means in the horizontal extension of the aforesaid track means, and a counterweight connected to said box carrier at a point eccentric to its guiding connection to effect the final tipping of the box carrier at the upper end of its movement.

10. In a fruit elevator, vertically movable means mounted to move up and down between lower and upper positions, a box-carrier pivotally mounted on said vertically movable means to move up and down therewith and to tip thereon, means for arresting the upward movement of said vertically movable means, operating means connected to lift said vertically movable means with the box-carrier, and means operated by said operating means to tip said carrier on such arrest of the vertically movable means.

11. In a fruit elevator, a box-carrier, vertically movable means to which the carrier is pivotally connected, a driving shaft, a crank thereon, and a pitman connected to said crank and connected to raise the vertically movable means, said pitman being connected to the box-carrier to tip the same when in raised position.

12. In a fruit elevator, a box carrier movable from lower to upper position, a driving shaft, a crank thereon, a pitman operated by said crank to raise the box carrier, and means for arresting the upward movement of said box carrier, said box carrier being connected to said pitman to continue to move the carrier when its upward movement is arrested; thereby tipping the carrier.

13. In a fruit elevating apparatus, track means, a box carrier pivotally and slidably engaging at a portion thereof with said track means, and having another portion engaging with the track means to determine the normal angular position of the box carrier, said track means being provided with stop means for arresting the upward movement of the portion of the box carrier engaging with the track means, and operating means movable upwardly and downwardly and connected to the box carrier at a part other than the part engaging with the track means to cause the carrier to be tipped by an upward movement of said operating means when the carrier is arrested by said stop.

14. In a fruit elevating apparatus, a box carrier, a track on which the box carrier is movable upwardly and downwardly, said box carrier provided with means for engaging said track, and said track being provided with means for arresting the upward movement of said engaging means, and operating mechanism comprising a crank, and a connection from said crank to the box carrier at a part other than the means engaging with the track, whereby the upward movement of the box carrier by the operating means will cause the box to be tipped after the said stop has arrested the movement of the engaging part of the box carrier.

In testimony whereof, I have hereunto set my hand at Los Angeles, California, this 30th day of March 1909.

FRED STEBLER.

In presence of—
 ARTHUR P. KNIGHT,
 FRANK L. A. GRAHAM.